N. B. KEYES.
METHOD OF MAKING HANDLED IMPLEMENTS.
APPLICATION FILED NOV. 24, 1915.
1,189,701.
Patented July 4, 1916.
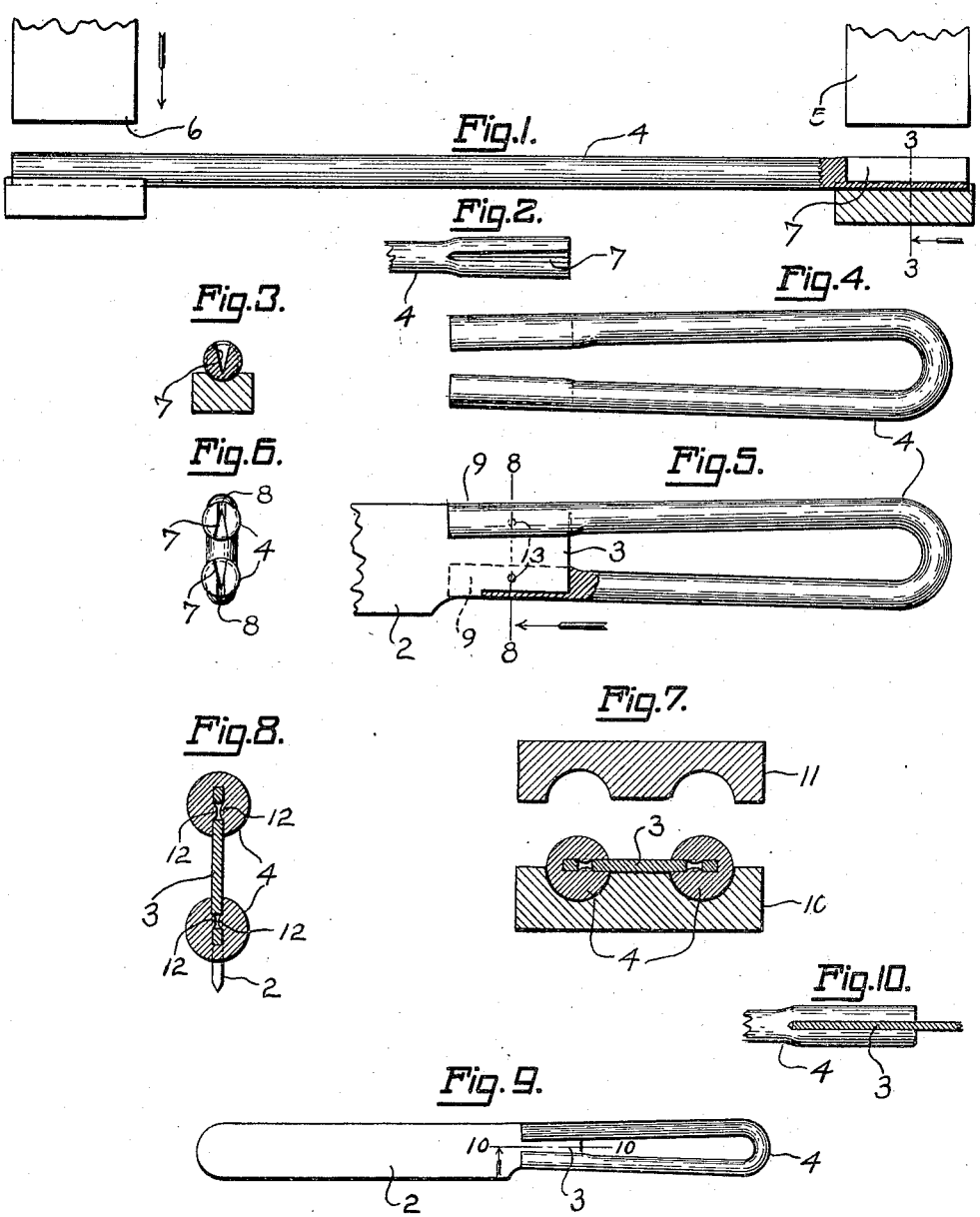

UNITED STATES PATENT OFFICE.

NELSON B. KEYES, OF UNIONVILLE, CONNECTICUT, ASSIGNOR TO THE H. C. HART MANUFACTURING COMPANY, OF UNIONVILLE, CONNECTICUT, A CORPORATION OF CONNECTICUT.

METHOD OF MAKING HANDLED IMPLEMENTS.

1,189,701.   Specification of Letters Patent.   Patented July 4, 1916.

Application filed November 24, 1915. Serial No. 63,345.

*To all whom it may concern:*

Be it known that I, NELSON B. KEYES, a citizen of the United States, residing at Unionville, in the county of Hartford and State of Connecticut, have invented certain new and useful Improvements in Methods of Making Handled Implements, of which the following is a specification.

This invention relates to a method of making handled implements. By the method I can produce in a quick, effective manner a device of the kind set forth. The implement possesses unusual strength and is of such a nature that it can be produced at less expense than can those of similar type.

In the drawings accompanying and forming part of the present specification I have shown in detail certain appliances by which the method can be practised. I do not restrict myself, however, to such disclosure; I may depart therefrom in several respects within the scope of the invention defined by the claims following said description.

Referring to said drawings: Figure 1 is an elevation of a partially formed blank with a portion in section, showing two knives. Fig. 2 is a top plan view of one of the notched ends of the blank. Fig. 3 is a transverse section on the line 3—3 of Fig. 1, looking in the direction of the arrow. Fig. 4 is a side view of the handle blank doubled on itself; Fig. 5 is a similar view with the tang or shank of the blade inserted in the notches of the branches of the handle, one of said branches being shown in section. Fig. 6 is an end view of the handle as seen from the left in Fig. 4. Fig. 7 is a detail view in section showing the handle associated with dies. Fig. 8 is a transverse section about on the line 8—8 of Fig. 5, and looking toward the front but showing the terminals of the handle compressed onto the tang. Fig. 9 is an elevation of the finished implement. Fig. 10 is a sectional detail, the section being on the line 10—10 of Fig. 9, looking upward.

Like characters refer to like parts throughout the several views, which it should be noted are on different scales.

The article made by the method can take various forms. In the present case the implement is shown as a knife blade 2, having a shank or tang as 3. There are at the present time in use knives and other implements having wire handles. These handles are made from a length of wire of the proper gage or bar of the requisite length. Their ends are slotted or kerfed. This slotted or kerfed wire or bar is doubled or bent on itself into approximately U-form, the shank or tang of the blade being fitted into the slots or kerfs of the branches of the handle, the handle and the blade being rigidly united together.

I provide the implement of whatever character it may be, that is in the form of a knife blade or otherwise, with a wire handle. By virtue of my invention, as will hereinafter more particularly appear, I find that I can use a smaller gage wire than is necessary at the present time. With this smaller gage wire I can produce an article which is materially stronger at the joint between the implement or blade and handle than is the case with those now in use.

In Fig. 1 I have shown a handle blank as 4. This blank 4 is made of wire of the requisite length and its end portions are notched for instance by knives as 5 and 6, the knife 5 having formed the notch in its end of the blank, while the knife 6 is assumed to be descending to notch its end of the blank sustained by a suitable support or fixture. The knives 5 and 6 are practically of chisel shape, and the notches 7 which they make are approximately of acute V-form. By notching instead of slotting the blade at its end portions, I do not lose any of the stock which is the case when the blank is slotted as was done before my present invention. The forward ends of the notches are open, the rear ends being closed. The notching of the blank has the effect of increasing the cross sectional extent thereof. The notching of the blank is ordinarily the first step which occurs in the method. After the terminal portions of the blank 4 are notched, said blank is doubled on itself in some suitable way into practically U-shape, so that the open sides of the notches face each other as shown for instance in Figs. 4, 5 and 6. The branches of the handle 4 are slotted as at 8 inwardly from their forward ends on the outer sides, the slots 8 receiving the offset or shouldered portions 9 of the tang 3. The slots may, of course, be made before the blank is bent on itself. The slots are quite short, and their presence does not weaken the connection between the implement and its handle. After the blank is in the condition shown in Fig. 4, the tang 3 is slipped into the transversely alined notches 7 until the end of the tang strikes the bottoms against the rear closed ends of the notches at which time the offset portions 9 will be in the slots 8 and abutting against the rear walls of said slots. The handle with the blade connected with it is laid in a die member as 10 after which a companion die member as 11 strikes the notched and slotted portion of the handle so as to compress the handle upon the tang and to force some of the stock as 12 into perforations as 13 in the tang to thus firmly interlock the handle and the implement or blade 2. In Fig. 7 which shows the die members 10 and 11 the compressing die member 11 is assumed to have exercised its function.

It should be noted that the notches 7 taper inwardly, and when the tang 3 is inserted into said notches, it is thrust rearwardly until as already noted it strikes the rear ends of the notches or practically so, the tapering of the notches longitudinally from their open ends insuring the initial grip of the sides of the notches upon the tang to an extent sufficient to prevent the accidental separation of the blade and handle. The compressing of the blade upon the handle will, of course, permanently unite the two parts. It will be perceived that I lose no stock. As a matter of fact that part of the handle 4 which receives the tang is thicker than the remainder of the handle, the handle-receiving portion of each branch being actually bulged on its sides which adds to the strength of the device.

What I claim is:

1. A method comprising notching the ends of a length of wire, then doubling the wire on itself to bring the notches opposite with their open sides facing each other, then introducing the tang of an implement into the notches, and then compressing the ends of the length of the wire onto the tang.

2. A method comprising the formation of notches of V-shape in the ends of a blank, then doubling the blank on itself to bring the notches opposite with their open sides facing each other, then introducing the tang of an implement into the notches and then compressing the notched portion of the blank onto the tang.

In testimony whereof I affix my signature in presence of two witnesses.

NELSON B. KEYES.

Witnesses:
ROBERT E. TAFT,
LEON A. HART.

Copies of this patent may be obtained for five cents each, by addressing the "Commissioner of Patents, Washington, D. C."